Figure 1:
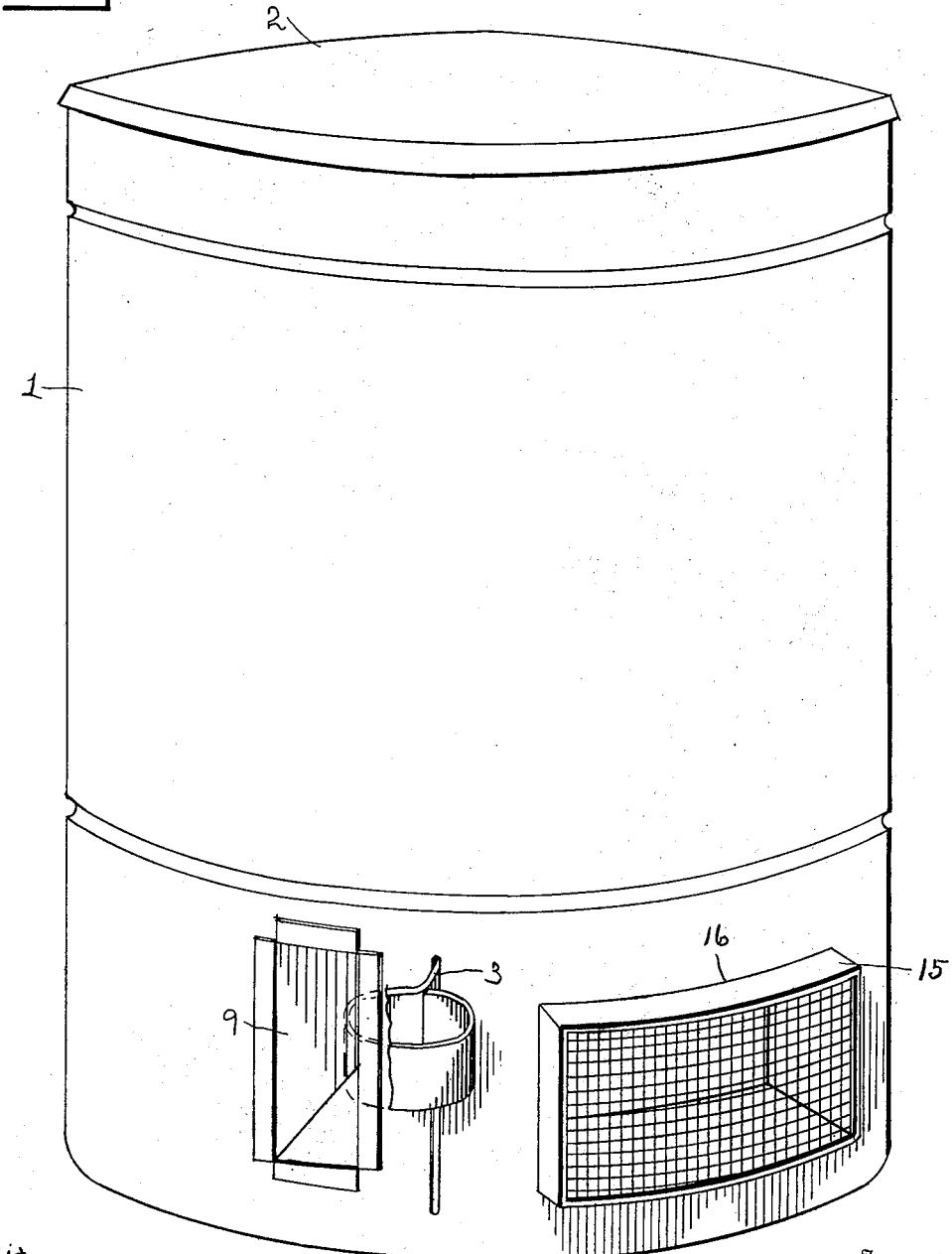
Figure 5:
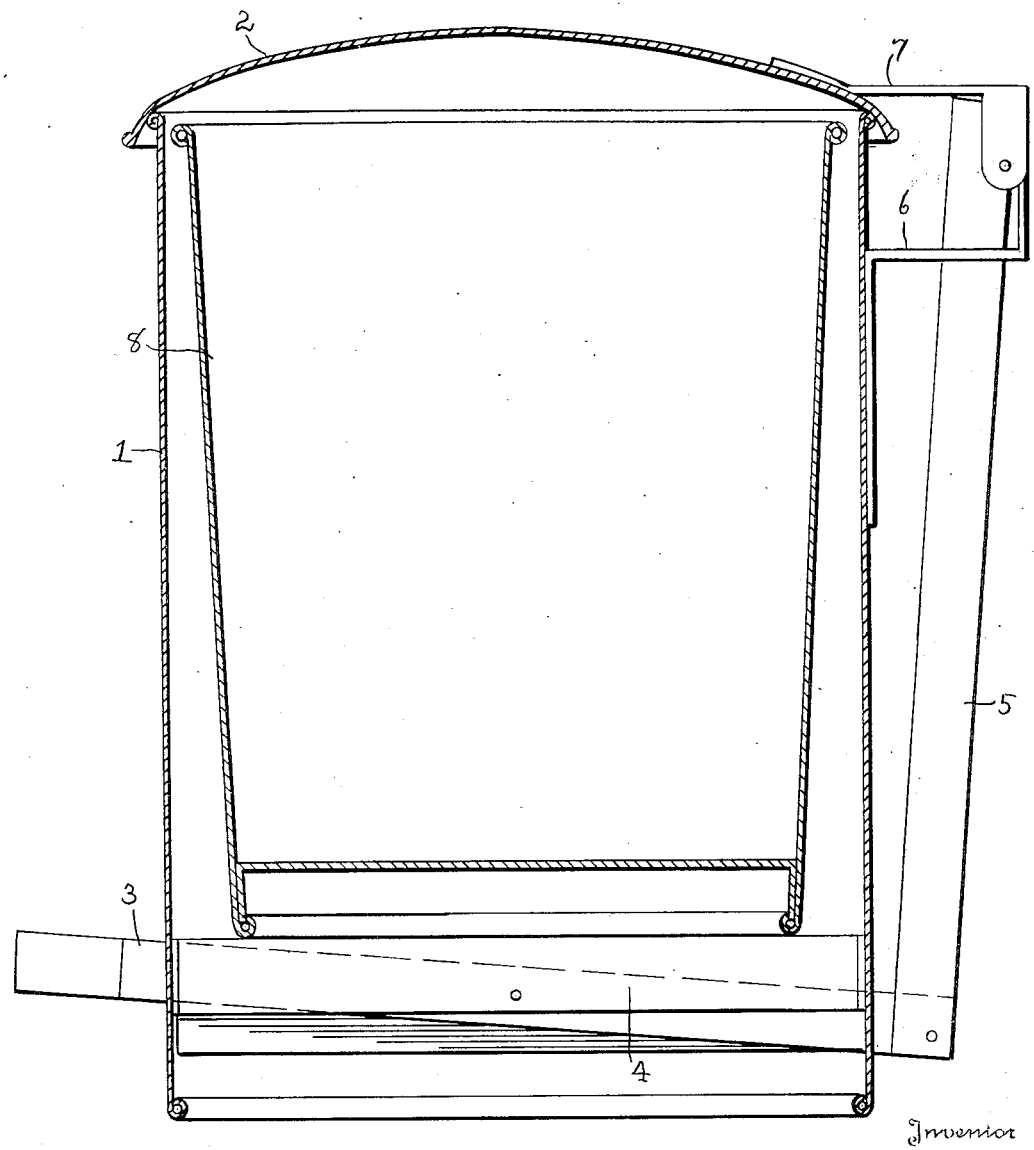

Jan. 9, 1934.    P. F. HARRIS    1,943,177
TRAP
Filed May 13, 1930    3 Sheets-Sheet 1

Witness    Inventor
Alfred E Glascock    Purley F. Harris

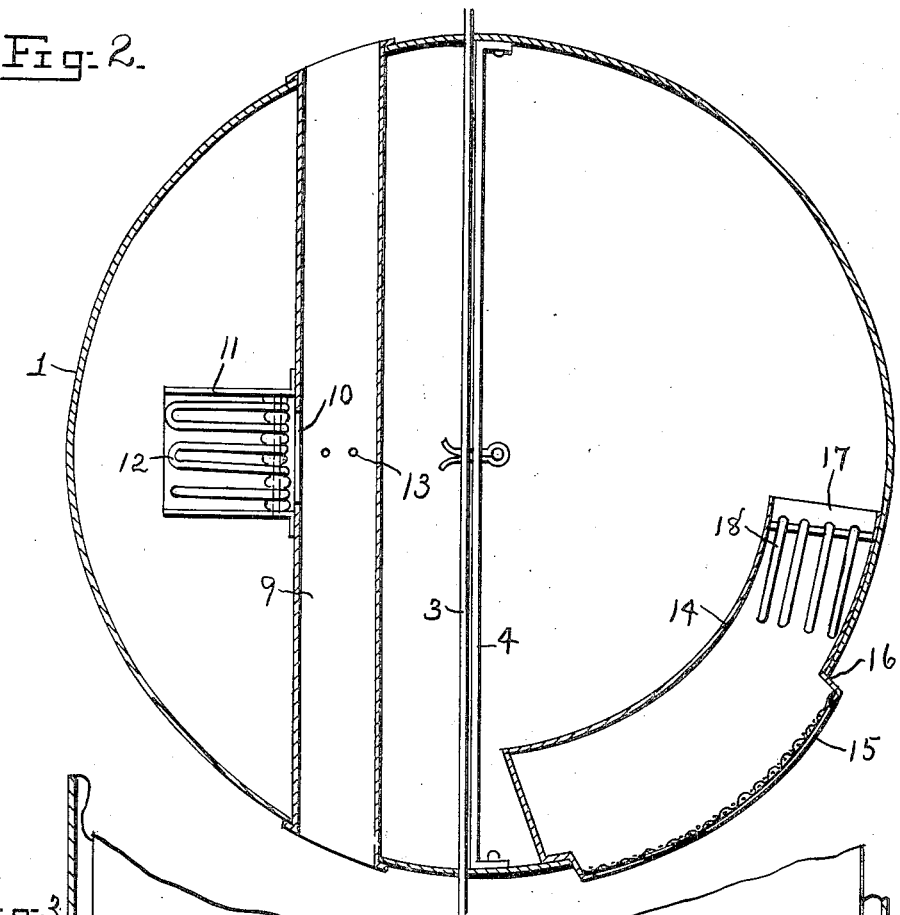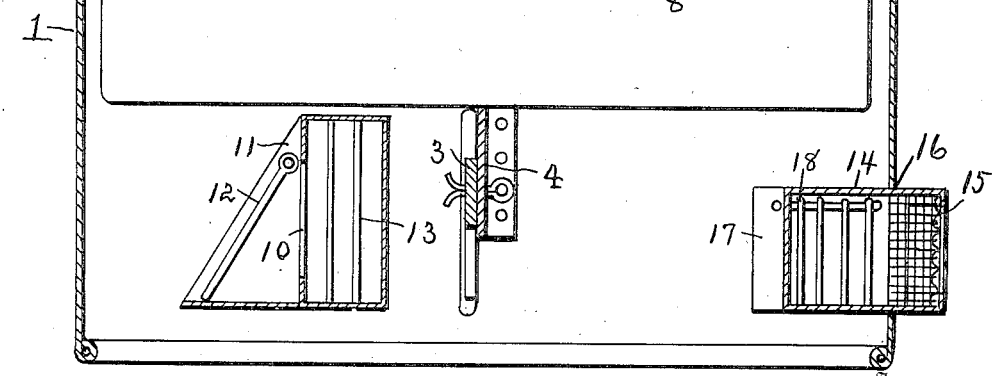

Jan. 9, 1934.   P. F. HARRIS   1,943,177
TRAP
Filed May 13, 1930   3 Sheets-Sheet 3

Inventor
Parley F. Harris

Patented Jan. 9, 1934

1,943,177

UNITED STATES PATENT OFFICE 1,943,177

TRAP

Parley F. Harris, Washington, D. C.

Application May 13, 1930. Serial No. 452,009

3 Claims. (Cl. 43—66)

This invention relates to a trap especially adapted to be used for catching mice, rats and similar rodents and it consists in the novel feature, hereinafter described and claimed.

An object of the invention is to provide a trap of the character stated, which is ever set and always ready to catch the quarry, one which does not require baiting or setting and one in which the animal may be seen when it has been trapped.

A further object of the invention is to provide a trap of the character stated which is of simple and durable structure, cheap to manufacture and which does not present objectionable appearance when being used. Other objects and advantages will be made manifest and apparent as the description of the invention progresses.

In the accompanying drawings:—

Figure I is a perspective view of the trap.

Figure II is a horizontal sectional view thereof.

Figure III is a detailed vertical sectional view thereof.

Figure IV is a sectional detail of the cell.

Figure V is a substantially central vertical section through the trap.

The trap contemplates in its makeup the use of a casing adapted to retain a garbage can, waste paper basket or other receptacles adapted to receive and hold garbage or refuse and as shown in the drawings 1 indicates the casing having a cover 2 pivotally connected therewith. A treadle lever 3 is pivoted to a cross bar 4 located in the lower portion of the casing and a push bar 5 is pivoted at one end to the lever 3 and passes through a guide 6 attached to the casing and has its upper end located under a bar 7 which is connected with the cover 2 and the guide 6. Therefore when pressure is applied to the forward end of the lever 3, as by stepping thereon, the said lever is swung and the bar 5 is moved longitudinally, whereby the cover is swung from a closed position as shown in Figure V to an open position, in a usual manner.

A garbage pail or waste paper basket 8 is housed in the casing 1 and rests upon the cross bar 4. The upper edge and the sides of the receptacle 8 are spaced from the inner surfaces of the walls of the casing 1 so that fumes from the contents of the receptacle 8 may pass down between the walls of the receptacle and the casing and enter the area enclosed by the walls of the casing below the bottom of the receptacle 8.

A passageway 9 leads into the lower portion of the casing 1 at a level below the bottom of the receptacle 8 and said passageway is provided with an opening 10 and a vertical wall 11 attached to its side at said opening. A barrier gate 12 is pivoted to the platform at the upper edge of the opening 10 and is adapted to swing outwardly with relation to said opening. As shown in the drawings the passageway 9 extends completely across the casing 1 and is provided at a point adjacent the opening 10 with spaced bars 13 which serve to prevent the mouse or animal from passing through the passageway from end to end thereof. The lower edge of the opening 10 is located at a higher level than the bottom of a cell which will now be described.

The cell 14 is provided at one side with a bay window extension 15 which is adapted to fit snugly in an opening 16 provided in the side of the casing 1 and at a point below the bottom of the receptacle 8. The cell 14 is provided at one end with a platform 17 and a barrier gate 18 is pivotally mounted in said platform and arranged to swing inwardly with relation to the cell.

Assuming that the receptacle 8 is retaining garbage or other refuse and the cover 2 is closed upon the casing 1. The fumes from the garbage pass out of the receptacle 8 and descend through the space between the walls of the receptacle and the casing and enter the passageway 9 through the opening 10. From the said passageway the fumes pass out into the room at the ends thereof. The animal, presumably a mouse, smells the escaping fumes and is attracted thereby toward the passageway 9 of the casing. In an endeavor to get at the source of origin of the fumes the animal enters the passageway 9 and passes through the opening 10 and roots under the barrier gate 12. The said gate lifts and the animal enters the space in the lower portion of the casing 1 below the receptacle 8. The barrier gate 12 then automatically swings by gravity to a closed position as shown in Figure III, and the animal is trapped in the pound which is that area in the casing 1 lying below the receptacle 8.

When the animal is within the pound it will continue in its search for the source of origin of the fumes and in doing so it will pass completely around the side walls of the casing 1. In the course of time the animal will discover that it is impossible to get at the source of origin of the fumes and it will then seek to make a getaway from the pound. It cannot retreat through the passageway by which it entered for the reason that the gate 12 is closed. Eventually the animal will see the light through the opening 16 or become sensitive to the fact that there might be an exit through said opening and in order to get to the said opening the animal will mount the platform 17 and root under the barrier gate 18 and enter the cell 14. At this time the gate 18 closes behind the animal and it is confined in close quarters in the cell 14 and may be observed from the exterior through the grating provided at the bay window extension 15.

When the receptacle is to be used and in the event that an animal is observed in the cell the casing may be opened, the receptacle removed and the cell removed from the casing and the animal may be disposed of in any manner. The cell is then put back in place, the receptacle housed in the casing, the refuse is deposited in the receptacle and the cover of the receptacle is closed and consequently the trap is reset and rebaited.

It will be noted that there is space all around the trap under the parts 3, 4 etc. and this provides open space for the animal to get to the cell from the initial trap door. See Figure III.

Having described the invention what is claimed is:—

1. A trap comprising a casing to removably receive a refuse container to permit the odors therefrom to accumulate within said casing, said casing having a passageway between the interior and exterior thereof to permit the escape of odors and the entrance of rodents to the interior of the casing, and a rodent trapping means removably secured in said casing and extending through a wall of the casing to receive light from the exterior of the casing and permit rodents caught therein to be viewed from the exterior of the casing.

2. A trap comprising a casing to removably receive a refuse container to permit the odors therefrom to accumulate within said casing, said casing having a passageway between the interior and exterior thereof to permit the escape of odors and the entrance of rodents to the interior of the casing, said casing having an opening, a rodent trapping cage having an entrance located within the casing and provided with a portion having an opening removably mounted in the opening of the casing, and foraminous material closing the opening of the cage.

3. A trap comprising a casing to removably receive a refuse container to permit odors therefrom to accumulate within said casing, means for supporting the container in slight spaced relation to the walls of the casing for permitting the odors from the container to circulate within the casing, a hollow member extending through opposite walls of the casing and having an opening to permit rodents passing through said hollow member to enter the casing, a gate associated with said opening to prevent rodents after entering the casing from leaving therefrom by way of said opening, and a rodent trapping cage within said casing and removable therefrom.

PARLEY F. HARRIS.